United States Patent
Barde et al.

(10) Patent No.: US 9,525,197 B2
(45) Date of Patent: Dec. 20, 2016

(54) STABLE NON-AQUEOUS ELECTROLYTE PROMOTING IDEAL REACTION PROCESS IN RECHARGEABLE LITHIUM-AIR BATTERIES

(75) Inventors: Fanny Jeanne Julie Barde, Holsbeek (BE); Peter George Bruce, Newport-on-tay (GB); Yuhui Chen, St Andrews (GB); Stefan Freunberger, St Andrews (GB)

(73) Assignees: TOYOTA MOTOR EUROPE NV/SA, Brussels (BE); THE UNIVERSITY COURT OF THE UNIVERSITY OF ST. ANDREWS, St. Andrews (GB)

( * ) Notice: Subject to any disclaimer, the term of this patent is extended or adjusted under 35 U.S.C. 154(b) by 206 days.

(21) Appl. No.: 14/350,903

(22) PCT Filed: Oct. 10, 2011

(86) PCT No.: PCT/EP2011/067652
§ 371 (c)(1),
(2), (4) Date: Nov. 24, 2014

(87) PCT Pub. No.: WO2013/053378
PCT Pub. Date: Apr. 18, 2013

(65) Prior Publication Data
US 2014/0255802 A1    Sep. 11, 2014

(51) Int. Cl.
*H01M 10/052* (2010.01)
*H01M 12/08* (2006.01)
(Continued)

(52) U.S. Cl.
CPC ......... *H01M 12/08* (2013.01); *H01M 10/0567* (2013.01); *H01M 10/0569* (2013.01);
(Continued)

(58) Field of Classification Search
CPC . H01M 10/052; H01M 10/0525; H01M 4/133
See application file for complete search history.

(56) References Cited

U.S. PATENT DOCUMENTS 5,053,375 A * 10/1991 Rao ..................... H01M 4/8807
427/115
7,282,295 B2   10/2007 Visco et al.
(Continued)

FOREIGN PATENT DOCUMENTS

EP    1 096 591 A1    5/2001

OTHER PUBLICATIONS

Read, "Characterization of Lithium/Oxygen Organic Electrolyte Battery," *Journal of the Electrochemical Society*, Jul. 29, 2002, pp. A1190-A1195; vol. 149 No. 9.
(Continued)

*Primary Examiner* — Stewart Fraser
*Assistant Examiner* — Olatunji Godo
(74) *Attorney, Agent, or Firm* — Oliff PLC

(57) ABSTRACT

The present invention relates to a lithium-air battery including: a negative electrode containing a negative-electrode active material; a positive electrode using oxygen as a positive-electrode active material; and an electrolyte medium arranged between the negative electrode and the positive electrode; wherein the electrolyte medium includes as primary solvent one or more compounds having an —N—CO— group in the molecule.

13 Claims, 8 Drawing Sheets

1: Rechargeable Metal-Air battery
2: Anode
3: Air cathode
4: Electrolyte
5: Anode collector
6: Air cathode collector

(51) Int. Cl.
- H01M 10/0567 (2010.01)
- H01M 10/0569 (2010.01)
- H01M 12/06 (2006.01)
- H01M 10/0568 (2010.01)

(52) U.S. Cl.
CPC ........ *H01M 12/06* (2013.01); *H01M 10/0568* (2013.01); *H01M 2300/0025* (2013.01)

(56) References Cited

U.S. PATENT DOCUMENTS

| | | | |
|---|---|---|---|
| 7,491,458 | B2 | 2/2009 | Visco et al. |
| 2007/0117007 | A1* | 5/2007 | Visco ............... H01M 2/1646 429/144 |
| 2009/0053594 | A1* | 2/2009 | Johnson ............... H01M 4/90 429/163 |
| 2009/0239113 | A1 | 9/2009 | Hase et al. |
| 2010/0266907 | A1 | 10/2010 | Yazami |
| 2010/0273066 | A1 | 10/2010 | Flanagan et al. |
| 2011/0059355 | A1 | 3/2011 | Zhang et al. |

OTHER PUBLICATIONS

Read et al., "Oxygen Transport Properties of Organic Electrolytes and Performance of Lithium/Oxygen Battery," *Journal of the Electrochemical Society*, Aug. 27, 2003, pp. A1351-A1356, vol. 150, No. 10.

Read, "Ether-Based Electrolytes for the Lithium/Oxygen Organic Electrolyte Battery," *Journal of the Electrochemical Society*, Dec. 2, 2005, pp. A96-A100, vol. 153 No. 1.

Xu et al., "Optimization of Nonaqueous Electrolytes for Primary Lithium/Air Batteries Operated in Ambient Environment," *Journal of the Electrochemical Society*, Jul. 27, 2009, pp. A773-A779, vol. 156. No. 10.

Xu et al., "Effects of Nonaqueous Electrolytes on the Performance of Lithium/Air Batteries," *Journal of the Electrochemical Society*, Dec. 18, 2009, pp. A219-A224, vol. 157 No. 2.

Xu et al., "Crown Ethers in Nonaqueous Electrolytes for Lithium/Air Batteries," *Electrochemical and Solid-State Letters*, Feb. 4, 2010, pp. A48-A51, vol. 13 No. 4.

Kuboki et al., "Lithium-Air Batteries Using Hydrophobic Room Temperature Ionic Liquid Electrolyte," *Journal of Source Powers*, May 31, 2005, pp. 766-769, vol. 146.

Ye et al., "Polymer Electrolytes Based on Ionic Liquids and Their Application to Solid-state Thin-film Li-Oxygen Batteries," *ECS Transactions*, 2008, pp. 73-81, vol. 3 No. 42.

Zhang et al., "Novel Composite Polymer Electrolyte for Lithium Air Batteries," *Journal of Source Powers*, Aug. 31, 2009, pp. 1202-1206, vol. 195.

Hassoun et al., "Investigation of the $O_2$ Electrochemistry in a Polymer Electrolyte Solid-State Cell," *Angewandte Chemie International Edition*, 2011, pp. 1-5, vol. 50.

Laoire et al., "Influence of Nonaqueous Solvents on the Electrochemistry of Oxygen in the Rechargeable Lithium-Air Battery," *Journal of Physical Chemistry*, Apr. 12, 2010, pp. 9178-9186, vol. 114.

Laoire et al., "Rechargeable Lithium/TEGDME-$LiPF_6$/$O_2$ Battery," *Journal of the Electrochemical Society*, Jan. 19, 2011, pp. A302-A308, vol. 158 No. 3.

Freunberger et al., "The Lithium-Oxygen Battery with Ether-Based Electrolytes," *Angewandte Chemie International Edition*, 2011, pp. 1-6, vol. 50.

Zhang et al., "Partially Flourinated Solvent as a Co-Solvent for the Non-Aqueous Electrolyte of Li/Air Battery," *Journal of Power Sources*, Nov. 11, 2010, pp. 2867-2870, vol. 196.

Zhang et al., "A Non-Aqueous Electrolyte for the Operation of Li/Air Battery in Ambient Environment," *Journal of Power Sources*, Jan. 8, 2011, pp. 3906-3910, vol. 196.

Kamaya et al., "A Lithium Superionic Conductor," *Nature Materials*, Jul. 31, 2011, pp. 682-686, vol. 10.

Ogasawara et al., "Rechargeable $Li_2O_2$ Electrode for Lithium Batteries," *JACS Articles*, Jan. 5, 2006, pp. 1390-1393, vol. 128.

Song et al., "Review of Gel-Type Polymer Electrolytes for Lithium-Ion Batteries," *Journal of Power Sources*, 1999, pp. 183-197, vol. 77.

Croce et al., "Role of the Ceramic Fillers in Enhancing the Transport Properties of Composite Polymer Electrolytes," *Electrochimica Acta*, 2001, pp. 2457-2461, vol. 46.

Świerczynski et al., "Composite Polymeric Electrolytes from the PEODME-$LiClO_4$-$SiO_4$ System," *Chemistry of Materials*, Mar. 24, 2001, pp. 1560-1564, vol. 13 No. 5.

Bryantsev et al., "Computational Study of the Mechanisms of Superoxide-Induced Decomposition of Organic Carbonate-Based Electrolytes," *The Journal of Physical Chemistry Letters*, 2011, pp. 379-383, vol. 2.

Nov. 17, 2011 International Search Report issued in International Application No. PCT/EP2011/067652.

Apr. 15, 2014 Written Opinion issued in International Application No. PCT/EP2011/067652.

* cited by examiner

1: Rechargeable Metal-Air battery
2: Anode
3: Air cathode
4: Electrolyte
5: Anode collector
6: Air cathode collector

STABLE NON-AQUEOUS ELECTROLYTE PROMOTING IDEAL REACTION PROCESS IN RECHARGEABLE LITHIUM-AIR BATTERIES

The present invention relates to rechargeable lithium-air/lithium-oxygen batteries and processes for using them.

BACKGROUND OF THE INVENTION

In recent years, with the rapid spread of information-related devices and communication devices such as personal computers, camcorders and cellular phones, it has become important to develop a battery for use as a power source for such devices. In the automobile industry, the development of high-power and high-capacity batteries for electric vehicles and hybrid vehicles has been promoted. Among various kinds of batteries, rechargeable lithium batteries have attracted attention due to their high energy density and high power.

Especially, rechargeable lithium-air batteries have attracted attention as a rechargeable lithium battery for electric vehicles and hybrid vehicles, which is required to have high energy density. Rechargeable lithium-air batteries use oxygen in the air as a cathode active material. Therefore, compared to conventional lithium rechargeable batteries containing a transition metal oxide (e.g., lithium cobaltate) as a cathode active material, rechargeable lithium-air batteries are able to have larger capacity.

In metal-air batteries, the cathode active material, oxygen, is not contained within the battery. Instead, this material is provided by the surrounding atmosphere. Naturally, such a system allows in principle a very high specific energy (energy provided by the battery per unit weight, typically given in Wh/kg in this technical field). In such batteries, oxygen may be partially reduced to peroxide, or fully reduced to hydroxide or oxide depending on the catalyst, electrolyte, availability of oxygen etc. When the negative electrode (anode) is lithium (Li), lithium peroxide ($Li_2O_2$) or lithium oxide ($Li_2O$) may be formed.

A metal-air battery may be schematically represented in FIG. 1. It contains mainly the following parts:
- metal anode (preferentially Li),
- non-aqueous electrolyte,
- air cathode (preferentially $O_2$ cathode) most commonly and usually preferably based on carbon (but other cathode materials are known in this context), binder and sometimes catalyst.

The ideal reactions during the use of such a battery should be as follows:

Upon discharge:

At anode: $Li \rightarrow Li^+ + e^-$

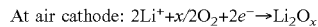

At air cathode: $2Li^+ + x/2O_2 + 2e^- \rightarrow Li_2O_x$

Upon charge:

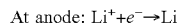

At anode: $Li^+ + e^- \rightarrow Li$

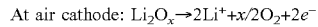

At air cathode: $Li_2O_x \rightarrow 2Li^+ + x/2O_2 + 2e^-$

In the reaction which occurs in the air cathode upon discharge, the lithium ion ($Li^+$) is dissolved from the anode by electrochemical oxidation and transferred to the air cathode through an electrolyte. The oxygen ($O_2$) is supplied to the air cathode.

Nevertheless, during electrochemical processes of the battery, it can happen that the $O_2$ or $O_2$-derived species react with the solvent molecules of the electrolyte, which may lead to the formation of side reaction products such as $Li_2CO_3$, Li formate, Li acetate etc. These products are not desirable in the battery and are believed to reduce the metal-air battery performance.

These side-reactions may lead to poor re-chargeability of the system and poor capacity retention. These general problems may be illustrated schematically as shown in FIGS. 2 and 3.

The problems shown schematically in FIGS. 2 and 3 may be summarized as follows:

Problem 1: Low initial capacity. This is a problem for both primary and secondary metal-air non-aqueous batteries.

Problem 2: Low efficiency of system, characterized by a large voltage gap between charge and discharge voltages. This is only an issue for secondary metal-air non-aqueous batteries subjected to charging and discharging cycles.

Problem 3: Poor capacity retention, which leads to bad cyclability of the system and a low number of cycles because the capacity drops rapidly. This also is only an issue for secondary metal-air non-aqueous batteries.

Problem 4: The reaction process is slow and charge/discharge performances at high current are lower.

A number of workers have investigated various electrolytes and gel polymer electrolytes mainly with a view to either improving the discharge capacities for primary applications (i.e. solve problem 1 as listed above), or to protect the metal (Li). Unlike most of the references cited below, the present invention addresses problems arising in rechargeable applications of metal-air batteries.

[Reference 1 (non-patent): J. Read, J. Electrochem. Soc. 149 (9), A1190-A1195, (2002)] describes the use of an electrolyte comprising $LiPF_6$ in solvents selected from propylene carbonate (PC), γ-butyrolactone (γ-BL), ethylene carbonate (EC), diethyl carbonate (DEC), dimethyl carbonate (DMC), 1,2-dimethoxyethane (DME), tetrahydrofuran (THF), and combinations thereof. Electrolytes with high $O_2$ solubility correlated with high discharge capacity. PC:DEC was the preferred solvent combination.

[Reference 2 (non-patent): J. Read, J. Electrochem. Soc. 150 (10), A1351-A1356 (2003)] teaches that the discharge capacity is increased if electrolyte viscosity is decreased. It is taught that by increasing the $O_2$ concentration and/or partial pressure, discharge capacities can be increased.

[Reference 3 (non-patent): J. Read, J. Electrochem. Soc. 153, (1), A96-A100, 2006] describes the use of ether-based electrolytes, such as 1,2-dimethoxyethane (DME), 1,3-dioxolane (DOL), with different salts. Rate capabilities are said to be improved by optimizing the electrolyte viscosity.

[Reference 4 (non-patent): W. Xu, J. Xiao, J. Zhang, D. Y. Wang, J. G. Zhang, J. Electrochem. Soc. 2009, 156, A773] teach that electrolyte polarity is a more important factor influencing the electrochemical performances than the oxygen solubility in the electrolyte. It is described that the effect of electrolyte viscosity and conductivity on performances is limited. The $O_2$ diffusion rate through the open channels of the air electrode is several orders of magnitude higher than that through the liquid electrolyte. The open channels are strongly dependent on the polarity of solvent. Thus an electrolyte based on ethers & glymes can easily wet the surface of the carbon surface of the air electrode because these electrolytes have low polarity as well.

[Reference 5 (non-patent): W. Xu, J. Xiao, D. Wang, J. Zhuang, J-G. Zhang, JES, 157, (2), A219-A224, (2010)] teach that maximum capacity varies as a function of the amount of electrolyte. Also, the effect of TPFPB (tris (pentafluorophenyl)borane) as an additive in the electrolyte is studied. TPFPB facilitates the dissolution of large amounts of Li salts (such as LiF, $Li_2O$ and $Li_2O_2$) normally insoluble in organic solvents, but an increase in TPFPB % also leads to an increase of viscosity, which leads to a decrease of discharge capacity.

[Reference 6 (patent): US 2011/0059355 A1 (Battelle Memorial Institute)] describes how oxygen permeable membranes may be prepared to reduce overall battery weight and improve specific energy. The use of crown ethers as additive (e.g. 12-crown-4 or 15-crown-5) is described as increasing discharge capacity.

[Reference 7 (non-patent): W. Xu, J. Xiao, D. Wang, J. Zhang, J-G. Zhang, Electrochem. And Solid State Letters, 13, (4), A48-A51, (2010)] teaches the use of crown ethers used as additive with 1M lithium bis(trifluormethan-sulfonyl)imide (LiTFSI), propylene carbonate/ethylene carbonate (PC/EC) solvent. It is reported that when 15 wt % of 12-crown-4 or 15-crown-5 is added to the electrolyte, the capacity of Li/air cell increases by 28% and 16%, respectively.

[Reference 8 (non-patent): T. Kukobi, T. Okuyama, T. Ohsaki, N. Takami, J. Power Sources, 146, (2005), 766-769] describes a study of the influence of hydrophobic room temperature ionic liquids on discharge capacity.

[Reference 9 (non-patent): H. Ye, J. Xu, ECS Transactions, 3, (42), 73-81, (2008)] describes polymer electrolytes based on ionic liquids, such as salts of the TFSI anion (bis(trifluoromethanesulfonyl)imide), such as $P_{13}$TFSI ($P_{13}$ cation is 1-methyl-3-propylpyrrolidinium). The materials developed are taught to enable protection of Li, and reversible Li plating/stripping.

[Reference 10 (non-patent): D. Zhang, R. Li, T. Huang, A. Yu, Journal of Power Sources, 195, (2010), 1202-1206] discloses a composite polymer electrolyte for a Li-air battery. The principal goal is the protection of Li from water. A composite polymer electrolyte medium is prepared using a polymer component (PvDF-HFP), a lithium salt-ionic liquid (LiTFSI-PMMITFSI) and hydrophobic silica in a weight ratio of 27:70:3 wt %.

[Reference 11 (non-patent): J. Hassoun, F. Croce, M. Armand, B. Scosati, Angewandte Chemie Int. Ed. 2011, 50, 1-5] describe solid state $ZrO_2$ added to PEO-$LiCF_3SO_3$ as solvent-free polymer electrolyte.

[Reference 12 (non-patent): Cormac O. Laoire, S. Mukerjee, E. J. Plitcha, M. A. Hendrickson, K. M. Abraham J. Phys. Chem. (2010)] describe a study of electrolytes $TBAPF_6$ (tetrabutylammonium hexafluorophosphate) or $LiPF_6$ in DMSO, DME, TEGDME, acetonitrile.

[Reference 13 (non-patent): Cormac O Laoire, S. Mukerjee, E. J. Plitcha, M. A. Hendrickson, K. M. Abraham J. Electrochem. Soc. 158 (3), A302-A308 (2011)] disclose a rechargeable Li-air cell using an electrolyte composed of $LiPF_6$ in TEGDME (tetraethylene glycol dimethyl ether).

[Reference 14 (non-patent): S. A. Freunberger, Y. Chen, N. E. Drewett, L. J. Hardwick, F. Bardé, P. G. Bruce Angew. Chem. Int. Ed., 50, 1-6, (2011)] describe a lithium-oxygen battery with ether-based electrolytes. It is described that $Li_2O_2$ is formed as major discharge product during discharge. However, $Li_2O_2$ is not the main discharged product any more after just five cycles.

[Reference 15 (patent): US2010/0266907 A1, R. Yazami] describes electrochemical systems with a solvent having metal-ions and oxygen dissolved therein, a fluorinated or metalloprotein oxygen dissolution enhancer provided in the solvent for enhancing dissolution of the oxygen in the solvent, a metal oxide dissolution enhancer, and a current collector in electrical contact with the solvent.

[Reference 16 (non-patent): S. S. Zhang, J. Read, J. Power Sources 196, 2011, 2867] discloses the use of tris(2,2,2-trifluoroethyl)phosphite (TTFP) (30% wt) as co-solvent in propylene carbonate (PC) to improve the discharge performances of Li-air batteries. However TTFP-based electrolytes might not be suitable for use in rechargeable Li-air batteries since the valence of the phosphorus is +3, and so it can potentially be oxidized to +5 to form tris(2,2,2-trifluoroethyl)phosphate TFP.

[Reference 17 (non-patent): S. S. Zhang, K. Xu, J. Read, J. Power Sources 196, 2011, 3906-3910] similarly teaches the use of $LiCF_3SO_3$ in PC/TFP as solvent blend with different concentrations.

[Reference 18 (patent): US2009/0239113 A1, Hase et al.] discloses systems in which the positive electrode and the non-aqueous electrolyte solution of the Li-air battery contain a compound having a stable radical skeleton (e.g. nitroxyl radical).

In the field of lithium-air batteries, various considerations have led to a generalized preference for carbonate or ether solvents. It has been required to offer a broad electrochemical stability window, i.e. a solvent that is stable over a wide potential range, and no noted instability with respect to anode or cathode components. Redeposition of lithium as dendrites has also been a problem that workers in the field have sought to avoid. Much work has focused on providing lithium salts that are soluble in the solvents used, and show good conductivity, and on how lithium salts may be protected.

The basic concept for designing organic electrolytes for lithium batteries are given below. These electrolytes are generally required to present some fundamental properties and most of the time are prepared so as to obtain a compromise of all the properties listed below:
  High ionic conductivity
  Thermal and chemical stability
  Wide potential window (electrochemical stability)
  Low reactivity toward other components in the battery (separator, current collectors, electrodes . . . )
Additionally, it is best if those electrolytes are also:
  Non-toxic
  Safe, non-flammable
  Inexpensive In the case of electrolytes for use in metal-air battery applications, a high $O_2$ solubility and quick $O_2$ diffusion could be considered as further desirable features.

SUMMARY OF THE INVENTION

It has now surprisingly been found that favorable results may be obtained for the performance of lithium-air batteries by using as primary solvent in the electrolyte medium at least one solvent having an —N—CO— group in the molecule. Such solvents may in particular be linear amides, lactams, ureas.

Such solvents may provide one or more of the following technical improvements:
  a decrease of the voltage gap by a combination of increasing discharge voltage and decreasing charging voltage (partially resolving problem 2 as set out above)
  an increase of discharge performances (partially resolving problem 1 as set out above)

a capability of the electrolyte to promote the ideal reaction (i.e. $Li_2O_x$ formation and decomposition) in the Li-Air and Li—$O_2$ battery and this for several cycles.

In this context, the present invention thus provides a lithium air battery comprising:

a negative electrode containing a negative-electrode active material;

a positive electrode using oxygen as a positive-electrode active material; and an electrolyte medium arranged between the negative electrode and the positive electrode;

wherein the electrolyte medium comprises as primary solvent one or more compounds having an —N—CO— group in the molecule.

DETAILED DESCRIPTION OF THE INVENTION

Figure 1:
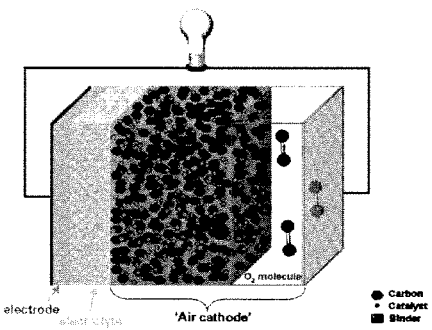
FIG. 1 is a general schematic diagram of a metal-air non-aqueous battery.
Figure 2:
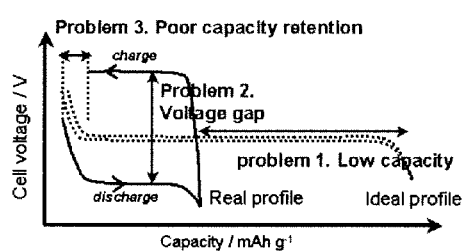
FIGS. 2 and 3 are schematic representations of problems to be addressed in metal-air non-aqueous batteries.
Figure 3:
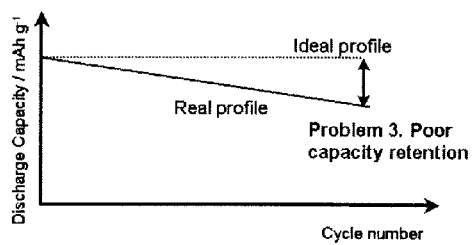
Figure 4:
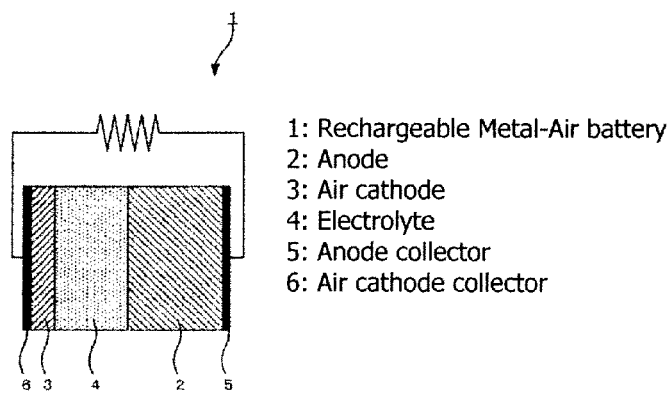
FIG. 4 is a schematic view describing the structure of a rechargeable metal-air battery.

In a lithium-air battery of the present invention, the negative electrode (which may also be referred to as "anode" hereinafter) comprises at least an anode active material (which may also be referred to as "negative electrode active material" hereinafter). As the anode active material, general anode active materials for lithium batteries can be used and the anode active material is not particularly limited. In general, the anode active material is able to store/release a lithium ion ($Li^+$). Specific anode active materials are, for example, metals such as Li, Na, K, Mg, Ca, Zn, Al and Fe, alloys, oxides and nitrides of the metals, and carbonaceous materials.

Specific anode active materials for rechargeable lithium-air batteries are, for example, a lithium metal, lithium protected anodes, lithium alloys such as a lithium-aluminum alloy, a lithium-tin alloy, a lithium-lead alloy and a lithium-silicon alloy, metal oxides such as a tin oxide, a silicon oxide, a lithium-titanium oxide, a niobium oxide and a tungsten oxide, metal sulfides such as a tin sulfide and titanium sulfide, metal nitrides such as a lithium-cobalt nitride, a lithium-iron nitride and a lithium manganese nitride, and carbonaceous materials such as, graphite. Of these, lithium metal is preferred.

By "lithium-protected anode", reference is made here for example (but is not limited to) to a "Lithium Protected Electrode" (LPE) as described by Visco et al. (Polyplus). Usually the Li is covered by a solid electrolyte (for example LISICON with formulae $LiM_2(PO_4)_3$). Between the LiSiCON and the Li metal, there is usually an interlayer (for example consisting of $Cu_3N/Li_3N$). In LPE systems, Li metal can be attached directly to one side of LiSiCON material, or alternatively a small amount of solvent containing a Li salt electrolyte may be added between the LiSiCON material and the Li metal to ensure Li ionic conductivity. Such materials have been described in, for example, U.S. Pat. No. 7,282,295, U.S. Pat. No. 7,491,458. LiSiCON materials have also been described in Nature Materials, 10, 682-686 (2011).

When a metal, alloy or the like in the form of foil or metal is used as the anode active material, it can be used as the anode itself.

The anode is required to contain at least an anode active material; however, as needed, it can contain a binder for fixing the anode active material. The type and usage of the binder are the same as those of the air cathode described hereinafter, so that they will not be described here.

In general, an anode collector is connected to the anode, which collects current from the anode. The material for the anode collector and the shape of the same are not particularly limited. Examples of the material for the anode collector include stainless steel, copper and nickel. Examples of the form of the anode collector include a foil form, a plate form and a mesh (grid) form.

In the lithium-air battery of the present invention, the positive electrode uses oxygen as a positive-electrode active material. Oxygen serving as the positive-electrode active material may be contained in air or oxygen gas.

In the lithium-air battery of the present invention, the positive electrode may be a component in which the redox catalyst is supported on a carrier. An example of the carrier is carbon. Examples of carbon include carbon blacks, such as Ketjen Black, acetylene black, channel black, furnace black, lamp black, and thermal black; graphite, such as natural graphite, e.g., scaly graphite, artificial graphite, and expanded graphite; activated carbon from charcoal and coal; carbon foam; carbon fibers obtained by carbonizing synthetic fibers and petroleum pitch-based materials; carbon nanofibers; molecular carbon such as fullerenes; and tubular carbon, such as carbon nanotubes. Modified carbons such as N-doped carbon may also be used.

Positive electrode materials can also be used in a lithium-air battery of the present invention based on materials other than carbon. For example, positive electrode materials based on metal foam, stable and conductive metal oxides, or steel, could be used.

In the present invention, where carbon is used, it is preferably a porous material in the form of a powder and preferably has a high specific surface area of 20 to 2000 $m^2/g$, preferably 60 to 2000 $m^2/g$ and most preferably 60 to 1500 $m^2/g$. For example, carbon may be used upon which a treatment is performed by a general method to increase porosity or surface area, followed by another treatment to increase the wettability. Examples of the commercial carbon products which can be used in the present invention include the KS series, SFG series, Super P series and Super S series available from TIMCAL Ltd., activated carbon products available from Norit, Black Pearl and AB-Vulcan 72 available from Cabot, and KB-ECP and KB-ECP600JD available from KB International. Other examples of commercially available carbon include the WAC powder series available from Xiamen All Carbon Corporation, PW15-type, 3-type and S-type Activated Carbons available from Kureha, and Maxsorb MSP-15 available from Kansai Netsu Kagaku.

Examples of the method for increasing the porosity, surface area and wettability of the carbon include physical activation or chemical activation. The chemical activation method includes, for example, immersing the carbon material in a strong alkaline aqueous solution (potassium hydroxide solution for example), in an acid solution (nitric acid or phosphoric acid for example) or in a salt (zinc chloride for example). This treatment can be followed (but not necessarily) by a calcination step at relatively low temperature (450° C. to 900° C. for example).

In the present invention, it is possible to use, for example, carbon black treated/activated by stirring it in concentrated $HNO_3$ for 3 days at room temperature. During the treatment/activation, the amount of acid versus carbon depends on the nature of the carbon and is preferably chosen to yield a slurry which is liquid enough to be stirred by means of a magnetic stirrer, etc. $HNO_3$ is preferable because it has an oxidizing effect on the carbon surface which affords polar groups on the surface that improves wettability. The carbon is then filtrated and washed with deionized water until a neutral pH of the solution is obtained. In this case, it is not necessary to apply a post calcination step.

In addition, the carbon preferably has pores having a pore diameter of 5 nm or more, preferably 20 nm or more. The specific surface area of the carbon and the pores size can be measured by the BET method or the BJH method, for example. Furthermore, in general, the carbon preferably has an average particle diameter (primary particle diameter) of 8 to 350 nm, more preferably 30 to 50 nm. The average primary particle diameter of the carbon can be measured by TEM.

The carbon used in the present invention may show any one of the above-mentioned preferred ranges for specific surface area, pore diameter or particle diameter. Preferred carbon in the framework of the invention includes carbon showing a preferred range for just one of these types of physical feature, or carbon showing preferred ranges for two of the features, or carbon showing preferred ranges for each of the three features of specific surface area, pore diameter or particle diameter.

Among forms of carbon that have specifically found to be advantageous in the present invention are: Super P® Li (Timcal) showing a particle size of 40 nm and a specific surface area (determined by the Brunauer Emmet & Teller method) of 62 $m^2/g$; Black Pearl® 2000 (from Cabot Corporation) showing a particle size of 12 nm and a Specific Surface Area (determined by the Brunauer Emmet & Teller method) of 1487 $m^2/g$; Ketjen Black® EC-600JD (from AzkoNobel) showing a specific surface area (determined by the Brunauer Emmet & Teller method) of 1400 $m^2/g$.

In the present invention, it has been found that a higher specific surface area and pore volume increases battery performance.

In lithium-air batteries, a catalyst is commonly added to the cathode because it is believed or demonstrated that it helps the $Li_2O_x$ decomposition during the charging/oxidation process. In the case of carbonate solvent-based electrolytes, the catalyst has been found to be necessary to allow the reduction the charging voltage and therefore solve partially problem 2 set out above (cf. JACS 128 (2006), 1390-1393). In the case of the present invention however, even without using catalyst it was still found possible to reduce the charge voltage and so at least partially solve problem 2. The chosen main electrolyte solvent thus appears by itself to promote the ideal reaction process. Consequently, in a preferred embodiment, the positive electrode contains a reduced amount of catalyst, such as less than 1% by mass, more preferably less than 0.1%, even more preferably less than 0.01% by mass with respect to the mass of the positive electrode. In one embodiment, the positive electrode contains substantially no material that can be considered to have catalytic activity at the cathode of a lithium air battery.

A catalyst, whilst not essential to satisfy all the desired requirements of a lithium-air battery in the present invention, may nonetheless contribute favorably to solving one or more problems that the present invention seeks to address. In another preferred embodiment therefore, the positive electrode has a catalyst content of 0.01% to 60% by weight, preferably 55% by weight or less, and more preferably 0.01% to 50% by weight with respect to the total weight of the positive electrode. A preferred quantity of catalyst is from 0.1% to 30% by weight, preferably 1% to 25% by weight, and more preferably 2% to 20% by weight, or even more preferably 3% to 15% by weight with respect to the total weight of the positive electrode. At a catalyst content of 0.01% by weight or more, the effect of the catalyst is sufficiently exhibited. At a catalyst content of 60% by weight or more, the proportions of other components such as a conductive material and a binder incorporated in the positive electrode tend to be too low, thus giving rise to possible reductions in conductivity and mechanical strength.

Types of catalyst material that can be used in a lithium-air battery according to the present invention include: transition metal oxides such as $MnO_2$ in various forms, preferably α-type, $Co_3O_4$, $Fe_2O_3$, CuO, $LiCoO_2$, mixed transition metal oxides such as $NiFe_2O_4$, $CoFe_2O_4$, $MnFe_2O_4$, Co phthalocyanine ($C_{36}H_{16}CoN_8$), metals (Mn, Co, Ru, Pt, Ag, CoMn, Au).

This catalyst may be dispersed/deposited onto the carbon to increase its efficiency. Air cathodes prepared using carbon on which catalyst is dispersed/deposited may also to be used in combination with the electrolyte of the present invention.

In the lithium-air battery of the present invention, the positive electrode may contain a conductive material, in addition to the carbon and non-carbon materials discussed above. Examples of such further conductive materials include conductive fibers such as metal fibers; metal powders, such as silver, nickel, aluminum powders; and organic conductive materials such as polyphenylene derivatives. These may be used separately or in combination as a mixture.

Moreover, the positive electrode may contain lithium oxide or lithium peroxide.

In the lithium-air battery of the present invention, the positive electrode may contain a binder. The binder is not particularly limited. The binder may be composed of a thermoplastic resin or a thermosetting resin. Examples thereof include polyethylene, polypropylene, polytetrafluoroethylene (PTFE), polyvinylidene fluoride (PVDF), styrene-butadiene rubber, tetrafluoroethylene-hexafluoropropylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. Copolymers having sulfonate group-terminated perfluorovinyl ether groups attached to a poly(tetrafluoroethylene) backbone, such as those commonly referred to as Nafion, may also be envisaged as polymer binder materials in the present invention. These materials may be used separately or in combination as a mixture.

In the framework of the present invention, it has been observed that partially fluorinated binder polymers such as PVDF may dissolve to some extent in —CO—N— group-containing solvents such as DMF, whereas fully fluorinated polymers such as PTFE are more resistant in this regard. In a preferred embodiment therefore, binder polymers may be used which show a ratio of C—F to C—H bonds of more than 3:1, most preferably substantially or completely fluorinated polymers with substantially no or no C—H bonds. Preferred organic polymer binders therefore include homopolymers and copolymers of one or more monomers selected from the group consisting of: tetrafluoroethylene, hexafluoropropylene, perfluoroalkyl vinyl ethers, sulfonate group-terminated perfluorovinyl ethers.

In the present invention, carbon may be coated with a catalyst material before mixing with the polymer binder.

In general, an air cathode collector is connected to the air cathode, which collects current from the air cathode. The material for the air cathode collector and the shape of the same are not particularly limited. Examples of the material for the air cathode collector include stainless steel, aluminum, iron, nickel, titanium and carbon. Examples of the form of the air cathode collector include a foil form, a plate form, a mesh (grid) form and a fibrous form. Preferably, the air cathode collector has a porous structure such as a mesh form since the collector having a porous structure has excellent efficiency of oxygen supply to the air cathode.

In some embodiments, the air electrode (air cathode) further comprises hydrophobic hollow fibers. A hydrophobic fiber tends to generate a space between itself and the electrolyte. These spaces facilitate $O_2$ diffusion in the air electrode, enabling a thicker electrode to be used. Typically carbon-based air electrodes are 0.5 to 0.7 mm thick. Addition of hydrophobic fibers allows use of electrodes that are at least 1 mm thick. Suitable fibers include DuPont HOLLOFIL® (100% polyester fiber with one more holes in the core), goose down (very small, extremely light down found next to the skin of geese), PTFE fiber, and woven hollow fiber cloth, among others. KETJENBLACK® carbon can also be coated on these fibers.

In the lithium-air battery of the present invention, the nonaqueous ion-conducting (electrolyte) medium arranged between the negative electrode and the positive electrode is a nonaqueous electrolytic solution containing one or more organic solvents and typically containing a salt. Non-limiting examples of the salt that can be used include known supporting electrolytes, such as $LiPF_6$, $LiClO_4$, $LiAsF_6$, $LiBF_4$, $Li(CF_3SO_2)_2N$, $Li(CF_3SO_3)$, and $LiN(C_2F_5SO_2)_2$. These salts may be used separately or in combination. The concentration of the salt is preferably in the range of 0.1 to 2.0 M and more preferably 0.8 to 1.2 M. In the present invention, the order of preference of salts is currently $LiClO_4 > LiTFSI > LiPF_6$ (TFSI=bis(trifluoromethanesulfonyl)imide).

Additives may be added to the electrolyte medium to enhance lithium ion dissolution, such as TPFPB (tris(pentafluorophenyl)borane) or crown ethers.

As set out above, the lithium air battery of the present invention uses as primary solvent in the electrolyte medium at least one solvent having an —N—CO— group in the molecule. Such solvents may in particular be linear amides, lactams, or ureas. The solvent in the electrolyte medium is constituted in particular by the liquid part of the electrolyte medium, it being borne in mind that in some instances the liquid part may potentially not be the largest part in mass terms of the electrolyte, in particular for polymer-based electrolytes.

Ideally, solvents in the present invention will present as many as possible of the following properties: stability against $O_2$-derived radicals and other bases and nucleophiles (e.g. $O_2^{2-}$ and $Li_2O_2$), low viscosity, high conductivity, high oxygen solubility and diffusion coefficient, high solubility of ions (especially $Li^+$), a low vapor pressure avoiding too rapid evaporation in case of an open-battery system, reasonably low melting point, reasonably hydrophobic, allowing ideal product reaction, a good wettability of the cathode (and its components; various types of carbon, binder, catalyst . . . ), good wettability of the separator and good wettability of other components of the battery, compatibility with an Li anode and reduction of problems associated with an Li anode (dendrite formation . . . ), a large electrochemical window where the solvent is stable, and thermal stability. Concerning melting point, although compounds having an —N—CO— group in the molecule and which are liquid at room temperature (about 20° C.) are a currently preferred group of electrolyte solvents, it is envisaged that batteries according to the invention could be used at temperatures above room temperature. In addition, a compound having an —N—CO— group in the molecule which is not liquid at room temperature, or at the temperature of use of the battery, could be used as part of the electrolyte medium in combination with another compound having an —N—CO— group in the molecule which is liquid at room temperature, or at the temperature of use of the battery, such that the combination of —N—CO— group-containing species is liquid at room temperature, or at the temperature of use of the battery.

Where the electrolyte medium of the lithium-air battery of the present invention is in the liquid phase, it is primarily constituted in mass terms by a continuous phase containing primarily one or more compounds containing —N—CO— groups. The compounds containing —N—CO— groups, and possibly other volatile aprotic organic solvents used in combination with the compounds containing —N—CO— groups, constitute the "solvent" part of the electrolyte medium, the other constituents being notably added supported electrolyte, such as lithium salts, and other additives such as the above-mentioned additives that may be used to enhance lithium ion dissolution. The total percentage of the "solvent" part in the electrolyte medium will most commonly be in the range of 70% to 99% by mass, with respect to 100% by mass of the electrolyte medium taking into account all its constituents. The compounds containing —N—CO— groups preferably constitute at least 40% by mass, more preferably at least 50% by mass, still more preferably at least 60% by mass, further more preferably at least 70% by mass, even more preferably at least 80% by mass, and most preferably at least 90% by mass with respect to 100% by mass of the electrolyte.

Currently preferred solvents within the framework of the invention are amides, lactams, or ureas, not having N—H groups. Amides R'—CO—NR$^1$R$^2$ or ureas R$^1$R$^2$N—CO—NR$^3$R$^4$ bearing any combination of substituents on the nitrogen atom may be used. For example, R' may be hydrogen or any organic group; R$^1$, R$^2$, R$^3$ and R$^4$ may each independently be any substituted or unsubstituted alkyl or aryl group, e.g. methyl, ethyl, propyl, iso-propyl, phenyl.

Currently preferred solvents include:

N,N-dimethylformamide (DMF), boiling point: 153° C.

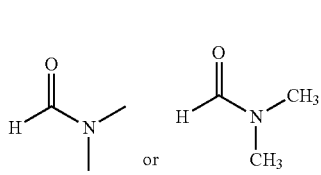

dimethylacetamide, boiling point: 164-166° C.

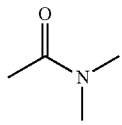

N-methylpyrrolidone, boiling point: 202-204° C.

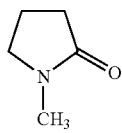

tetramethylurea (TMU)

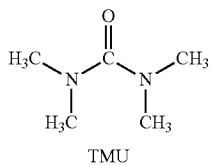

TMU tetraethylurea (TEU)

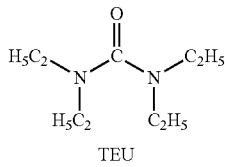

TEU

Two or more solvents in the above group can be used jointly in the framework of the present invention.

Other solvents containing an —N—CO— group in the molecule that could be used, although they are currently less preferred than the above set since they contain an N—H bond, include:

N-methyl-formamide

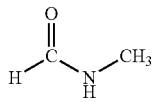

formamide

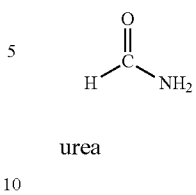

urea

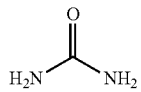

Combinations of the any of the above materials may be used in the framework of the present invention.

The solvents containing an —N—CO— group in the molecule can be used in the present invention in combination with aprotic organic solvents known for use in lithium-air batteries. Examples of such aprotic organic solvents include cyclic carbonates, chain carbonates, cyclic esters, cyclic ethers, and chain ethers. Examples of cyclic carbonates include ethylene carbonate, propylene carbonate, butylene carbonate, and vinylene carbonate. Examples of chain carbonates include dimethyl carbonate, diethyl carbonate, and methyl ethyl carbonate. Examples of cyclic ester carbonates include γ-butyrolactone and γ-valerolactone. Examples of cyclic ethers include tetrahydrofuran and 2-methyltetrahydrofuran. Examples of chain ethers include dimethoxyethane and ethylene glycol dimethyl ether. These may be used separately or in combination as a mixture. Nitrile solvents can also be used, such as acetonitrile, propionitrile, and 3-methoxypropionitrile.

In the present invention, the solvent of the electrolyte medium, in particular the liquid (solvent) part of the electrolyte medium, preferably contains at least 60% by volume, with respect to the total volume of the liquid part of the electrolyte medium, of compound(s) having an —N—CO— group in the molecule, more preferably at least 70% by volume, still more preferably at least 80% by volume, even more preferably more than 90% by volume with respect to the total volume of the liquid part of the electrolyte medium, and most preferably contains substantially only or only compound(s) having an —N—CO— group in the molecule.

In the present invention, although the primary component(s) of the liquid (solvent) part of the electrolyte medium is (are) constituted by compounds having a —N—CO— group such as in particular amides, lactams, or ureas, the liquid part of the electrolyte medium may contain up to 40% by volume, with respect to the total volume of the liquid part of the electrolyte medium, of an aprotic organic solvent chosen from the group consisting of: cyclic carbonates, chain carbonates, cyclic esters, cyclic ethers, chain ethers, nitriles. Preferably, less than 30% by volume, more preferably less than 20% by volume, and still more preferably less than 10% by volume, with respect to the total volume of the liquid part of the electrolyte medium, is constituted by such conventional solvents not having a —N—CO— group in the molecule.

In the framework of the present invention, gel polymer electrolytes can also be used in lithium-air batteries using solvent(s) containing an —N—CO— group in the molecule. The gelled electrolyte having lithium ion conductivity can be obtained by, for example, adding a polymer to the non-aqueous electrolytic solution for gelation. In particular, gelation can be caused by adding a polymer such as polyethylene oxide (PEO), polyvinylidene fluoride (PVDF, commercially available as Kynar, etc.), polyacrylonitrile (PAN), polymethyl methacrylate (PMMA), and poly(vinyl) chloride (PVC). A review of the use of gel-type polymer electrolytes for lithium-ion batteries is provided by Song et al., Journal of Power Sources, 77 (1999), 183-197.

Where a gel polymer electrolyte is used in the framework of the present invention, it is envisaged that an appropriate percentage by mass of solvent, expressed with respect to the electrolyte medium as a whole (solvent+gelling polymer+Li salts+possible additives), would be between 50% by mass and 70% by mass. For a solvent fully constituted by —N—CO— group-containing compounds, the latter would thus constitute between 50% by mass and 70% by mass of the electrolyte medium as a whole.

Components which can be cross-linked and/or thermoset may also be added to the gel electrolyte formulation to improve its mechanical properties.

Also, incorporation of substantial amount of plasticizers (PEG, crown ethers . . . ) may be carried out to improve the ionic conductivity of the polymer electrolytes.

In addition, nanoparticles/ceramics ($Al_2O_3$, $SiO_2$, $ZrO_2$, $MgO$, $CeO_2$ . . . ) may be added to such gel polymer electrolytes to increase their conductivities. Reference in this regard may be made to Croce et al., Electrochimica Acta 46 (2001), 2457-2461, or EP 1 096 591 A1.

The nanoparticle/ceramic filler content is usually less than 10 wt. % of the membrane. For example $Al_2O_3$ nanoparticles may be obtained from Aldrich Research Grade and have 5.8 nm particle size, cf. Swierczynski et al., Chem. Mater., 2001, 13, 1560-1564. $SiO_2$ fumed silica may be obtained from Aldrich Reagents Grade, with a 7 nm particle size. In general, the nanoparticle size is preferentially around 15 nm or below.

It may further be contemplated in the framework of the present invention to add an oxygen dissolution enhancer to the electrolyte medium. This oxygen dissolution enhancer may be a fluorinated polymer, a fluorinated ether, a fluorinated ester, a fluorinated carbonate, a fluorinated carbon material, a fluorinated blood substitute, or indeed a metalloprotein. Such oxygen dissolution enhancers are described in US 2010/0266907 (reference [15] cited above).

In the rechargeable lithium-air battery of the present invention, a separator may advantageously be provided between the air cathode and the anode for complete electrical insulation between these electrodes. The separator is not particularly limited as long as it is able to electrically insulate the air cathode and the anode from each other and has a structure that allows the electrolyte to be present between the air cathode and the anode.

Examples of the separator include porous films and nonwoven fabrics comprising polyethylene, polypropylene, cellulose, polyvinylidene fluoride, glass ceramics, etc. Of these, a separator of glass ceramics is preferred.

As the battery case for housing the rechargeable lithium-air battery, general battery cases for rechargeable lithium-air batteries can be used. The shape of the battery case is not particularly limited as long as it can hold the above-mentioned air cathode, anode and electrolyte. Specific examples of the shape of the battery case include a coin shape, a flat plate shape, a cylindrical shape and a laminate shape. It is possible for the battery of the present invention to be completely encased in an oxygen-permeable membrane, advantageously one which shows selectivity for oxygen diffusion over that of water.

The rechargeable lithium-air battery of the invention can discharge when an active material, which is oxygen, is supplied to the air cathode. Examples of oxygen supply source include the air and oxygen gas, and preferred is oxygen gas. The pressure of the supplied air or oxygen gas is not particularly limited and can be appropriately determined.

The shape of the lithium-air battery of the present invention is not particularly limited. Examples thereof include coin shapes, button shapes, sheet shapes, and laminate shapes. The lithium-air battery may have large shapes for use in electric cars and the like.

The lithium-air battery of the present invention may be used as a primary battery or a rechargeable secondary battery.

The lithium-air battery of the present invention may, for example, be put to practical use in a process wherein the battery is cycled between certain limits defined by initial and final voltage, or initial and final capacity or specific capacity. For example, one process for using the lithium-air battery of the present invention may consist of a process wherein:

(a) the lithium-air battery is provided in a fully charged state;

(b) the lithium-air battery is subjected to discharge until the specific capacity reaches a value X;

(c) the lithium-air battery is recharged;

(d) steps (b) and (c) are repeated.

The specific capacity value X selected may vary widely and, for example, be situated in the range of 200 to 10000 mAh/g. The specific capacity of a lithium-air battery may be determined by discharging up until 2 V. It may be appropriate during operation of the battery to cycle the battery within limits that do not go to full discharge or charge. It may be advantageous to cycle the battery between 10% to 90% of its specific capacity (determined in step (b)), preferentially 20% to 80%, more preferably 20% to 70%. Cycling may also be carried out between certain limits of initial or maximum theoretical discharge capacity. Capacity-limited cycling may enable the cell to survive longer, and it may thus be appropriate to limit the cycling capacity to around 30% of the full discharge capacity.

Figure 12:
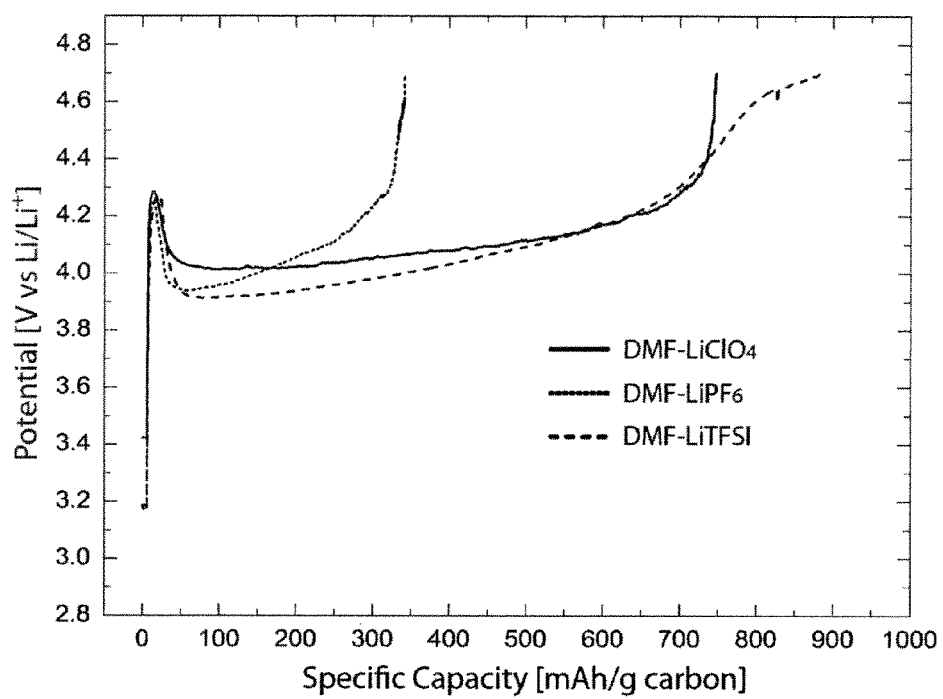
FIG. 12 shows a charge curve of air composite cathodes containing $Li_2O_2$ using electrolyte from Example 1.

It is possible to provide as a product a battery whose air cathode contains added $Li_2O_2$. Such a battery would typically be charged before use. The experiment presented in attached FIG. 12 shows that such a product presentation is feasible for a lithium-air battery according to the present invention.

Any combination of the above described elements in all possible variations thereof is encompassed by the invention unless otherwise indicated herein or otherwise clearly contradicted by context. Thus, all features and embodiments described herein in particular as applicable, advantageous or preferred in the context of the invention are to be construed as being applicable in combination with one another, in preferred embodiments of the invention.

EXAMPLES

Example 1

In DMF

Preparation of PTFE-Based Air Cathode (Working Electrode)

Carbon composite electrodes were made from carbon black (i.e. SuperP, SuperS, Blackpearl 2000 and Ketjen Black from Timcal Graphite & Carbon) and binder—in each case a 60% PTFE suspension in water from Sigma-Aldrich was applied. Carbon black powder was wetted by isopropanol or ethanol first prior to the addition of PTFE suspension. PTFE suspension was evenly added to wet carbon in the ratio 60:40 wt % (carbon and dry PTFE) for SuperP and SuperS, in the ratio of 40:60 wt % for BP2000 and Ketjen Black. The mixture was vigorously stirred and mixed for 0.5 hour by means of a magnetic stirrer or mechanical stirrer.

The slurry obtained was spread on the metal grid substrate of Al, Ni or stainless steel. The electrode was soaked in and rinsed by pure ethanol to remove the surfactant from PTFE suspension. After drying at 200° C. under vacuum for 12 h, the electrodes, having a thickness of about 150 µm, were transferred and stored in a glovebox filled with argon.

Preparation of Anode (Counter Electrode)

Anode was prepared from Li-rich material ($LiFePO_4$ was applied here), carbon black (SuperP was applied here) and binder (PTFE), with a ratio of 80:10:10 wt %. $LiFePO_4$ and carbon black was weighed out in to a vial and mixed evenly. The mixture was wetted by isopropanol or ethanol first prior to the addition of PTFE suspension. PTFE suspension was evenly added into wet mixture and then the mixture was vigorously stirred and mixed for 0.5 hour by means of a magnetic stirrer.

The slurry obtained was spread on the metal foil substrate of Al, Ni or stainless steel. The electrode was rinsed by pure ethanol to remove the surfactant from PTFE suspension. After drying at 200° C. under vacuum for 12 h, the electrodes are transferred and stored in a glovebox filled with argon.

Assembly of Rechargeable Metal-Air Battery

Next, a rechargeable metal-air battery was assembled in a glove box under an inert atmosphere (argon) using the obtained air cathode film. The three-electrode battery was built in a 5-port flask cell, the reference electrode here being a silver wire. All the joints are sealed with grease. Three ports are for working electrode, reference electrode and counter electrode, respectively, and another two ports are for the $O_2$ bubbling tube inlet and outlet. 2-3 ml of 0.5 M Li salt-DMF ($LiClO_4$, $LiPF_6$ and LiTFSI) electrolyte solution was added into the flask. The flask cell obtained was sealed inside the glovebox and then it was taken out for bubbling oxygen through for 10 min.

Example 2

In NMP

Generally the battery was assembled the same way as in Example 1 except that DMF was replaced by NMP.

Comparative Example 1

In PC

A rechargeable lithium-air battery was assembled similarly as in Example 1, except that DMF was replaced by PC.

Comparative Example 2

In TEGDME

A rechargeable lithium-air battery was assembled similarly as in Example 1, except that DMF was replaced by TEGDME.

Evaluation of the Rechargeable Li-Air Battery

Thus assembled rechargeable lithium-air battery was removed from the glove box and put under pure $O_2$ at 1 atm, and a constant flow amount of $O_2$ was supplied to the air cathode for 30 minutes. Next, the rechargeable lithium-air battery was locked under $O_2$ at 1 atm, and charge and discharge (charge and discharge rate: 50 mA/g-C, cut off voltage: 2-4.2V (vs $Li^+$/Li)) of the rechargeable lithium-air battery was repeated. In most of the cases, the electrochemical tests start by a discharge.

In one experiment, the electrochemical test began by a charge because the air cathode contained $Li_2O_2$. For this experiment, $Li_2O_2$ (Sigma-Aldrich) was also added to the carbon and the binder (PTFE) in the ratio 30:35:35% to prepare a slurry containing $Li_2O_2$. The results obtained using air cathodes containing $Li_2O_2$ are shown in FIG. 12.

Evaluation of Results

Figure 5:
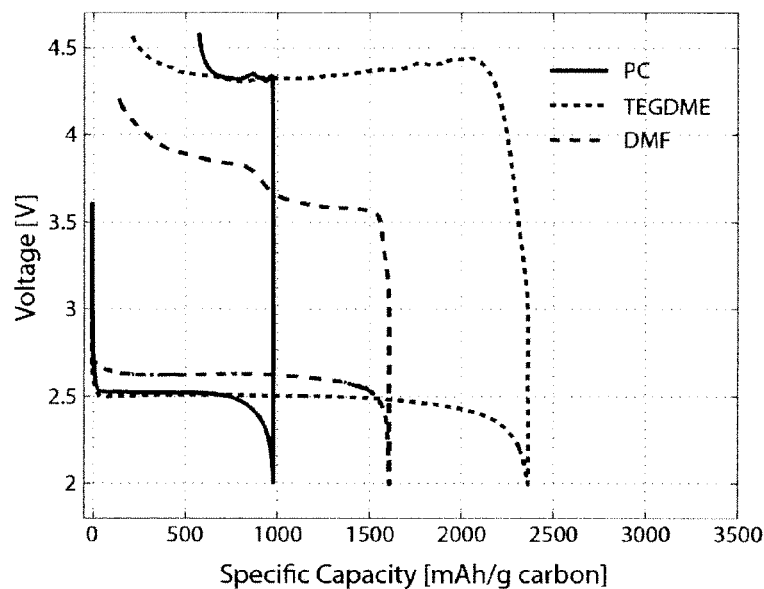
FIGS. 5 and 7 to 10 show charge-discharge performances for batteries prepared as described in the Examples and Comparative Examples.

FIG. 5 represents the Charge-Discharge performances obtained for Example 1 (SuperP-PTFE electrode in 0.5 M $LiClO_4$-DMF, 50 mA/g-C), for Comparative example 1 (SuperP-PTFE electrode 1M $LiPF_6$-PC, 50 mA/g-C) and for Comparative example 2 (SuperP-PTFE electrode, 1M $LiPF_6$-(Tetra-Ethylene Glycol Di-Methyl Ether)-TEGDME, 50 mA/g-C). In this case, SuperP-PTFE works as working electrode, Ag wire works as reference electrode and $LiFePO_4$-SuperP-PTFE works as counter electrode.

→It appears clearly that the voltage gap is reduced if DMF is used as a solvent in place of PC or TEGDME. This decrease of the voltage gap results from a combination of increased discharge voltage and decreased charging voltage. There is thus partial resolution of problem 2 without using a catalyst.

Figure 6:
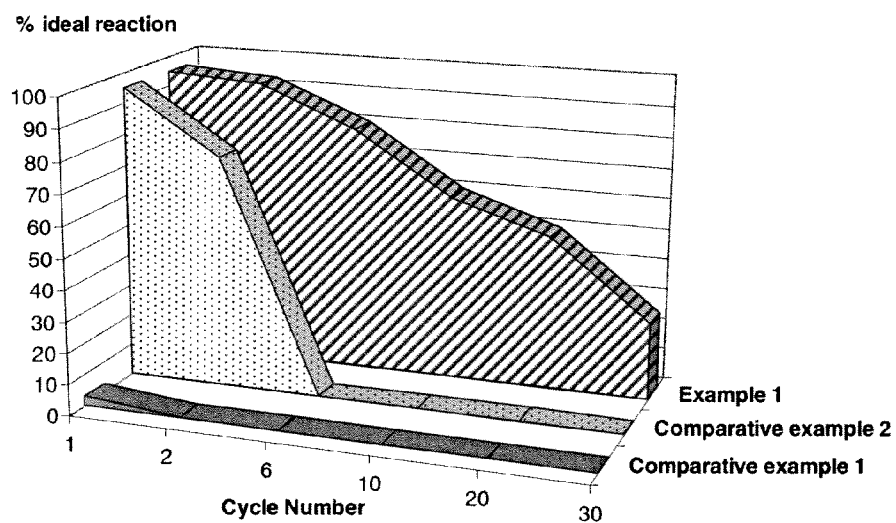
FIG. 6 shows the percentage of ideal reaction product formed during the discharge as a function of cycle number for Examples and Comparative Examples.

FIG. 6 represents the % of ideal reaction product formed during the discharge as a function of cycle number for Example 1 (DMF), Comparative example 1 (PC) and Comparative example 2 (TEGDME)

→It appears clearly that in DMF $Li_2O_2$ is the main discharge product formed and also $Li_2O_2$ remains the major discharge products formed for at least 30 cycles. In the case of PC, $Li_2O_2$ is never the major discharged product. In case of TEGDME, $Li_2O_2$ is the main discharge product for the first 6 cycles but not afterwards.

It is believed that using an amide promotes the formation of the expected ideal discharge product. This discharge product $Li_2O_2$ decomposing at a lower potential than the side reaction products, this may explain the lower voltage gap obtained in amides/ureas.

Figure 7:
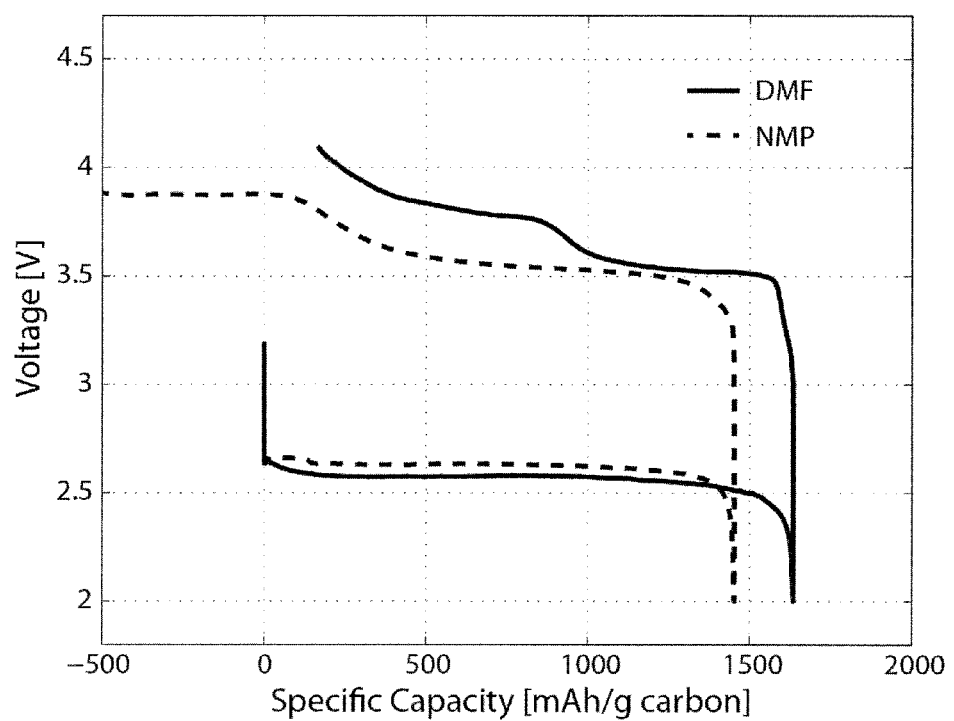

FIG. 7 represents the Charge-Discharge performances of Super P-PTFE composite electrodes for Example 1 (0.5 M $LiClO_4$-DMF) and Example 20.5 M $LiClO_4$-NMP) at a rate of 50 mA/g.

→This graph highlights that several amides are good candidate solvents for Li-Air battery electrolytes. Indeed, the voltage gap is low compared to voltage gap in PC or TEDGME.

In addition it shows that the charging capability of Example 2 is better than for Example 1 since the charge voltage rises later for Example 2 than for Example 1. Also the charge voltage in case of Example 2 reaches a limit around 3.9V versus $Li/Li^+$ which does not seem to be the case for Example 1.

Charging capability (Example 2)>(Example 1)

Figure 8:
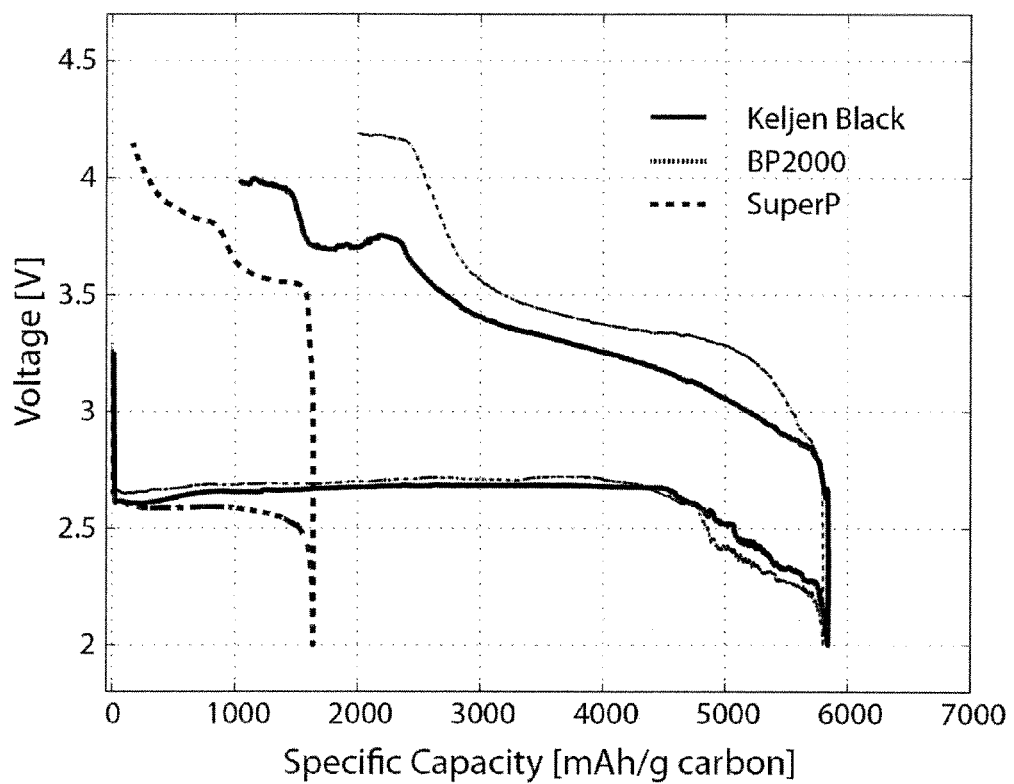

FIG. 8 represents the Charge-Discharge performances of Carbon-PTFE composite electrodes cycled in Example 1 (0.5 M $LiClO_4$-DMF). The carbon is either BP2000-PTFE, KB-PTFE or Super P-PTFE, tested at a rate of 50 mA/g.

→This graph shows that the discharge capacity of the battery cycled using the solvent Example 1 is clearly influenced by the type of carbon used to prepare the air cathode. The results show:

Capacity (BP2000)~Capacity (Ketjen Black)>>Capacity (Super P).

The better performances of BP2000 & Ketjen Black carbon may be correlated with their high surface area.

TABLE 2 summarizes the performances in more detail.

Figure 9A:
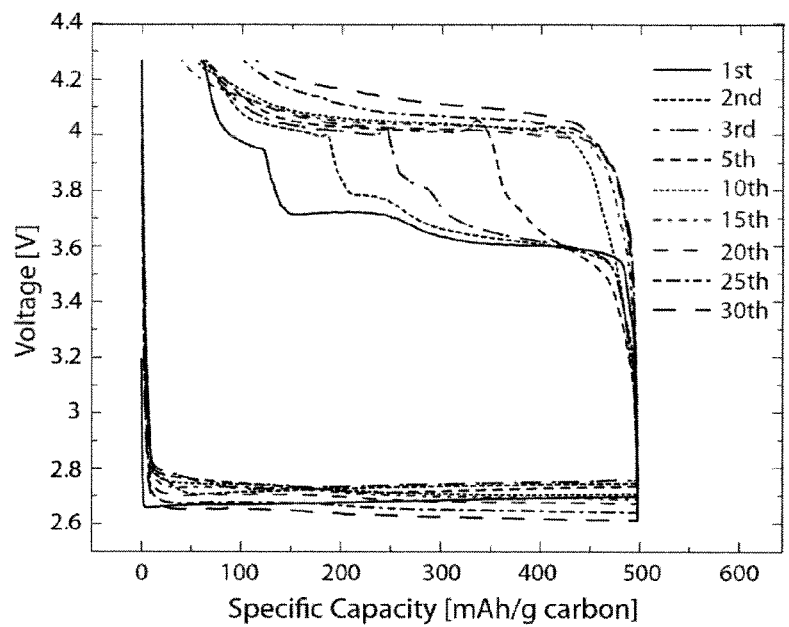
Figure 9B:
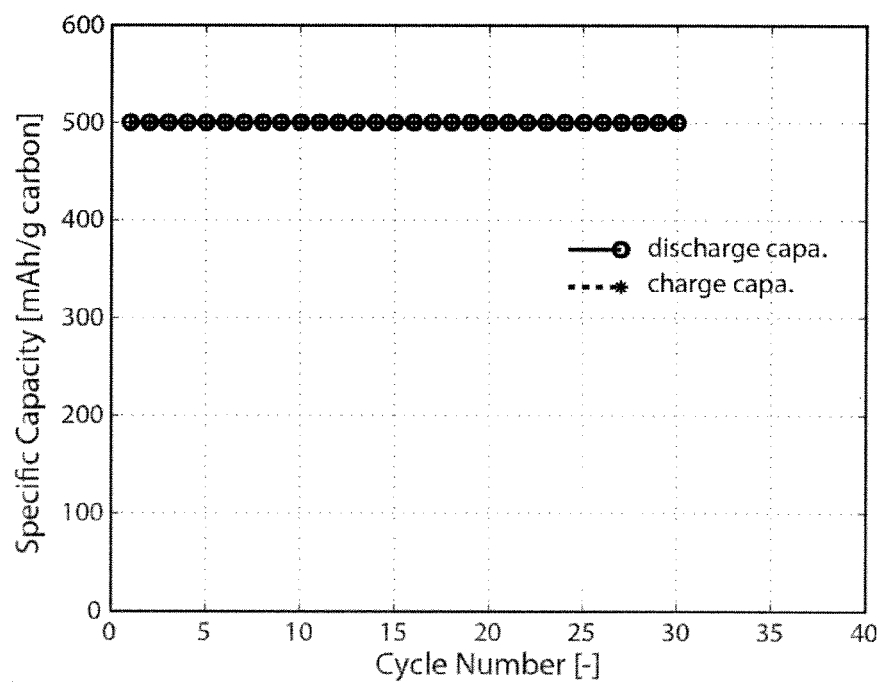

FIG. 9 (a) represents the Charge-Discharge performances obtained for Example 1 (0.5 M $LiClO_4$-DMF using the Super P carbon in air cathode), rate of 50 mA/g-C Cut-off limit during the discharge is capacity-related (=500 mAh/g-C).

FIG. 9 (b) represents the Specific capacity as a function of cycle number

→Those 2 graphs show that the capacity remains constant and equals 500 mAh/g-C if a capacity limitation is applied to the battery containing Example 1 as electrolyte. The capacity is then stable for at least 30 cycles.

Figure 10A:
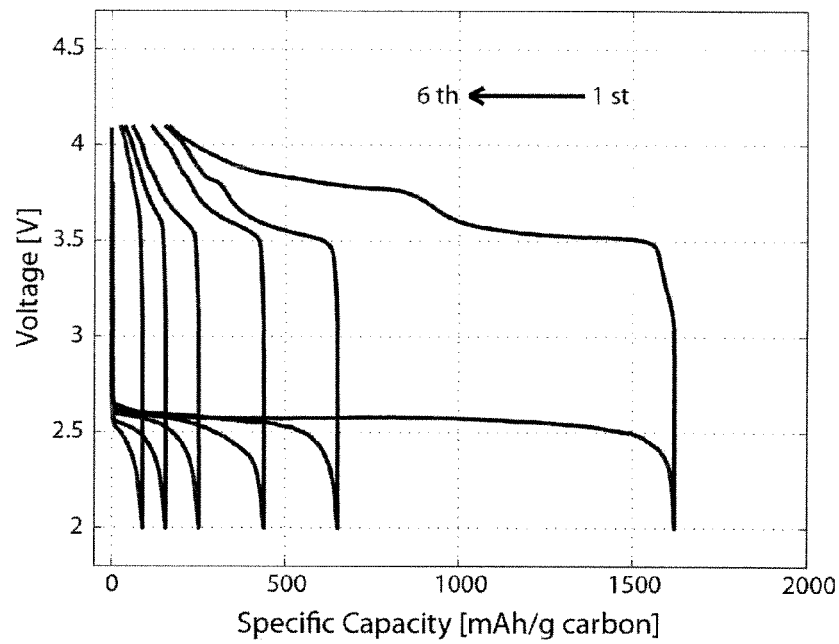
Figure 10B:
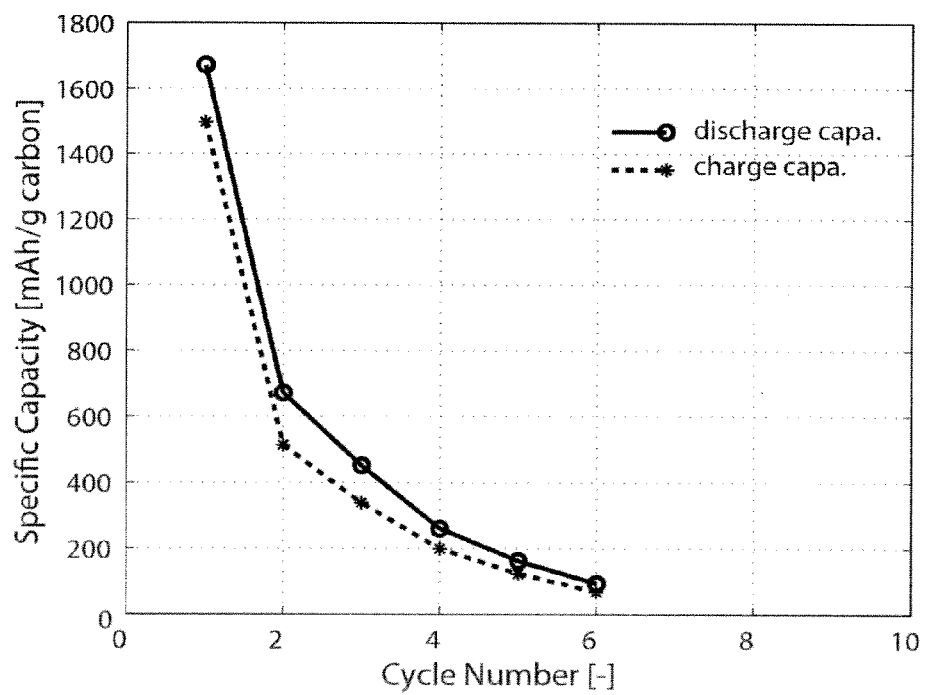

FIG. 10 (a) represents the Charge-Discharge performances obtained for Example 1 (0.5M $LiClO_4$-DMF using the Super P carbon in air cathode), rate of 50 mA/g-C.

Cut-Off limit during the discharge is voltage-related (=2V).

FIG. 10 (b) represents the Specific capacity as a function of cycle number

→Those 2 graphs show that the capacity decreases very rapidly if a 2V-cut off voltage is applied to the battery containing Example 1 as electrolyte.

FIG. 9 and FIG. 10 show the effect of the cycling conditions (more specifically the discharge limitation) on the performances of a battery containing amides/ureas as electrolyte.

Figure 11:
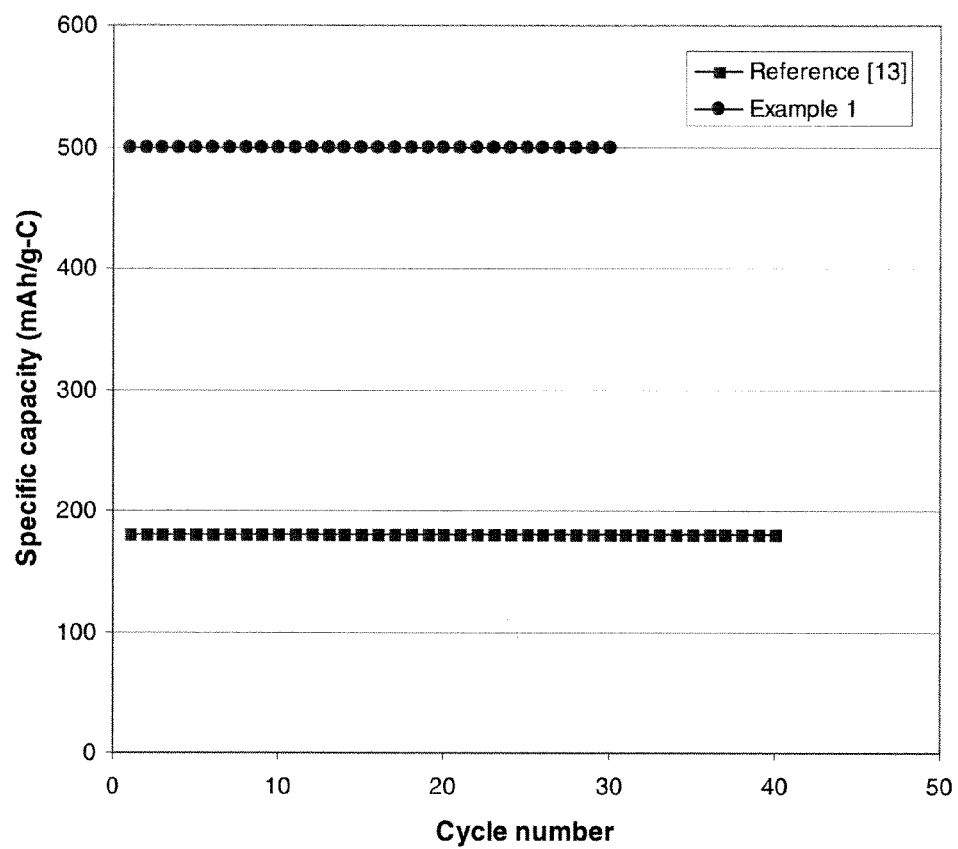
FIG. 11 shows specific capacity as a function of cycle number for Example 1 as compares to a prior art battery.

FIG. 11 represents the specific capacity as a function of cycle number for Example 1 (0.5M $LiClO_4$ in DMF on Super P-PTFE composite electrode) and for Reference [13] (1M $LiPF_6$ in TEGDME on BP2000-PVDF composite electrode)

→The performances in DMF are clearly superior to the performances previously reported in literature Reference [13].

FIG. 12 represents the charge curve of air composite cathodes containing $Li_2O_2$ using electrolyte from Example 1 tested in presence of various salts ($LiClO_4$, $LiPF_6$ or LiTFSI) tested at 50 mA/g-C. The theoretical capacity of $Li_2O_2$ is 1000 mAh/g-C.

→This graph shows that it is preferred to combine the electrolyte solvent of the invention (here Example 1) with the $Li^+$ salt following this trend: $LiClO_4$>LiTFSI>LiPF6. Indeed the charging performances would be better for $LiClO_4$-containing electrolyte than for LiTFSI-containing ones, itself better than for $LiPF_6$-containing ones.

TAB.1 presents a comparison of lithium-air battery performances during the cycle 1 for Examples 1 & 2 and for Comparative examples 1 & 2.

TAB.2 presents a comparison of lithium-air battery performances during cycle 1 using Example 1 as electrolyte combined with various carbon sources to prepare the air cathodes.

TABLE 1

Comparison of lithium-air battery performances during the cycle 1 for Examples 1, 2 and for Comparative examples 1 & 2

|  | Example 1 | Example 2 | Comparative example 1 | Comparative example 2 |
|---|---|---|---|---|
| Discharge capacity (mAh/g-C) | 1640 | 1430 | 1200 | 2600 |
| Total Charge capacity <4.2 V (mAh/g-C) | 1460 | 1430 | 50 | 150 |
| Charge capacity <4 V (mAh/g-C) | 1390 | 1430 | 0 | 100 |
| Charge capacity <3.65 V (mAh/g-C) | 675 | 1072 | 0 | 50 |
| % Recharge <3.65 V | 41.2 | 75 | 0 | 1.9 |

TABLE 2

Comparison of lithium-air battery performances during cycle 1 using Example 1 as electrolyte combined with various carbon sources to prepare the air cathodes

|  | Example 1 combined with Super P | Example 1 combined with BP 2000 | Example 1 combined with Ketjen Black |
|---|---|---|---|
| Discharge capacity (mAh/g-C) | 1600 | 5800 | 5850 |
| Total Charge capacity <4.2 V (mAh/g-C) | 1400 | 3800 | 4850 |
| Charge capacity <4 V (mAh/g-C) | 1250 | 3200 | 4800 |
| Charge capacity <3.65 V (mAh/g-C) | 600 | 2900 | 3150 |
| % Recharge <3.65 V | 37.5 | 50 | 53.8 |

The invention claimed is:

1. A lithium-air battery comprising:
   a negative electrode consisting of lithium metal or a lithium alloy, and optionally a binder;
   a positive electrode using oxygen as a positive-electrode active material; and
   an electrolyte medium arranged between the negative electrode and the positive electrode;
   wherein the electrolyte medium comprises a liquid part that comprises, as a primary solvent, one or more compounds having an —N—CO— group in the molecule, and
   the liquid part of the electrolyte medium comprises at least 60% by volume, with respect to a total volume of the liquid part of the electrolyte medium, of compound(s) having an —N—CO— group in the molecule.

2. The lithium-air battery according to claim 1, wherein the compound having an —N—CO— group in the molecule is at least one selected from the group consisting of: linear amides; lactams; and ureas.

3. The lithium-air battery according to claim 1, wherein the compound having an —N—CO— group in the molecule is at least one selected from the group consisting of: N,N-dimethylformamide; dimethylacetamide; N-methylpyrrolidone; tetramethylurea; and tetraethylurea.

4. The lithium air battery according to claim 1, where the liquid part of the electrolyte medium comprises up to 40% by volume, with respect to the total volume of the liquid part of the electrolyte medium, of one or more aprotic organic solvents selected from the group consisting of: cyclic carbonates, chain carbonates, cyclic esters, cyclic ethers, chain ethers, and nitriles.

5. The lithium-air battery according to claim 1, wherein the electrolyte medium comprises a lithium salt at a concentration of at least 0.1 M and at most 2.0 M.

6. The lithium-air battery according to claim 1, wherein the electrolyte medium comprises a lithium salt selected from the group consisting of $LiClO_4$, LiTFSI and $LiPF_6$.

7. The lithium-air battery according to claim 1, wherein the electrolyte medium comprises at least 40% by mass, with respect to a total mass of the electrolyte medium, of one or more compounds having an —N—CO— group in the molecule.

8. The lithium-air battery according to claim 1, wherein the positive electrode comprises carbon.

9. The lithium-air battery according to claim 8, wherein the carbon is one or more types selected from the group consisting of: carbon black; graphite; activated carbon; carbon (nano)fiber; carbon foam; molecular carbon; tubular carbon; and N-doped carbon.

10. The lithium-air battery according to claim 8, wherein the carbon shows one, two or three of the following characteristics:
a specific surface area of between 20 and 2000 $m^2/g$; and/or
a pore diameter of 5 nm or more; and/or
an average primary particle diameter of 8 to 350 nm.

11. The lithium-air battery according to claim 1, wherein the positive electrode and/or the negative electrode contains at least one binder, the binder being selected from the group consisting of homopolymers and copolymers of one or more monomers selected from the group consisting of: tetrafluoroethylene, hexafluoropropylene, perfluoroalkyl vinyl ethers, and sulfonate group-terminated perfluorovinyl ethers.

12. The lithium-air battery according to claim 1, wherein the negative electrode is lithium metal.

13. The lithium-air battery according to claim 1, wherein the liquid part of the electrolyte medium comprises substantially only compounds having an —N—CO— group in the molecule.

* * * * *